United States Patent
Sugawara et al.

(10) Patent No.: US 12,292,388 B2
(45) Date of Patent: May 6, 2025

(54) DETERIORATION DIAGNOSIS DEVICE, DETERIORATION DIAGNOSIS METHOD, AND RECORDING MEDIUM

(71) Applicant: NEC Corporation, Tokyo (JP)

(72) Inventors: Chisato Sugawara, Tokyo (JP); Kazuki Inagaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 232 days.

(21) Appl. No.: 17/801,041

(22) PCT Filed: Feb. 16, 2021

(86) PCT No.: PCT/JP2021/005687
§ 371 (c)(1),
(2) Date: Aug. 19, 2022

(87) PCT Pub. No.: WO2021/186989
PCT Pub. Date: Sep. 23, 2021

(65) Prior Publication Data
US 2023/0081098 A1    Mar. 16, 2023

(30) Foreign Application Priority Data

Mar. 16, 2020 (JP) .................................. 2020-045357

(51) Int. Cl.
*G01N 21/88*     (2006.01)
(52) U.S. Cl.
CPC . *G01N 21/8851* (2013.01); *G01N 2021/8854* (2013.01); *G01N 2021/8877* (2013.01);
(Continued)

(58) Field of Classification Search
CPC ....... G01N 21/8851; G01N 2021/8854; G01N 2021/8887; G01N 2223/614; G05B 23/0283
See application file for complete search history.

(56) References Cited

U.S. PATENT DOCUMENTS

| 10,059,002 | B2 * | 8/2018 | Miyatani .............. G06V 10/993 |
| 11,361,556 | B2 * | 6/2022 | Jumonji ................... G08G 1/00 |
| 2018/0063488 | A1 * | 3/2018 | Sekine .................... G06T 7/001 |

FOREIGN PATENT DOCUMENTS

| JP | 2003-329594 A | 11/2003 |
| JP | 2008-122170 A | 5/2008 |

(Continued)

OTHER PUBLICATIONS

International Search Report for PCT Application No. PCT/JP2021/005687, mailed on Apr. 13, 2021.
(Continued)

*Primary Examiner* — Hung V Nguyen

(57) ABSTRACT

A deterioration diagnosis device according to an example aspect of the present invention includes: a memory; and at least one processor coupled to the memory. The processor performs operations. The operations include: acquiring an image including a portion to be diagnosed in a structure; calculating, by using the image, deterioration degree that is a degree of deterioration of the portion; calculating reliability for the deterioration degree based on imaging information that is information related to capturing of the image; and outputting the deterioration degree and the reliability in association with each other.

6 Claims, 10 Drawing Sheets

(52) U.S. Cl.
CPC ................ *G01N 2021/8887* (2013.01); *G01N 2223/614* (2013.01)

(56) References Cited

FOREIGN PATENT DOCUMENTS

| | | |
|---|---|---|
| JP | 2018-031664 A | 3/2018 |
| JP | 2019-049952 A | 3/2019 |

OTHER PUBLICATIONS

English translation of Written opinion for PCT Application No. PCT/JP2021/005687, mailed on Apr. 13, 2021.

\* cited by examiner

| DETERIORATION ITEM | DETERIORATION DEGREE | RELIABILITY |
|---|---|---|
| IRI | 10.5mm/m | 80% |
| CRACK RATE | 40% | 75% |
| RUT AMOUNT | 40mm | 80% |

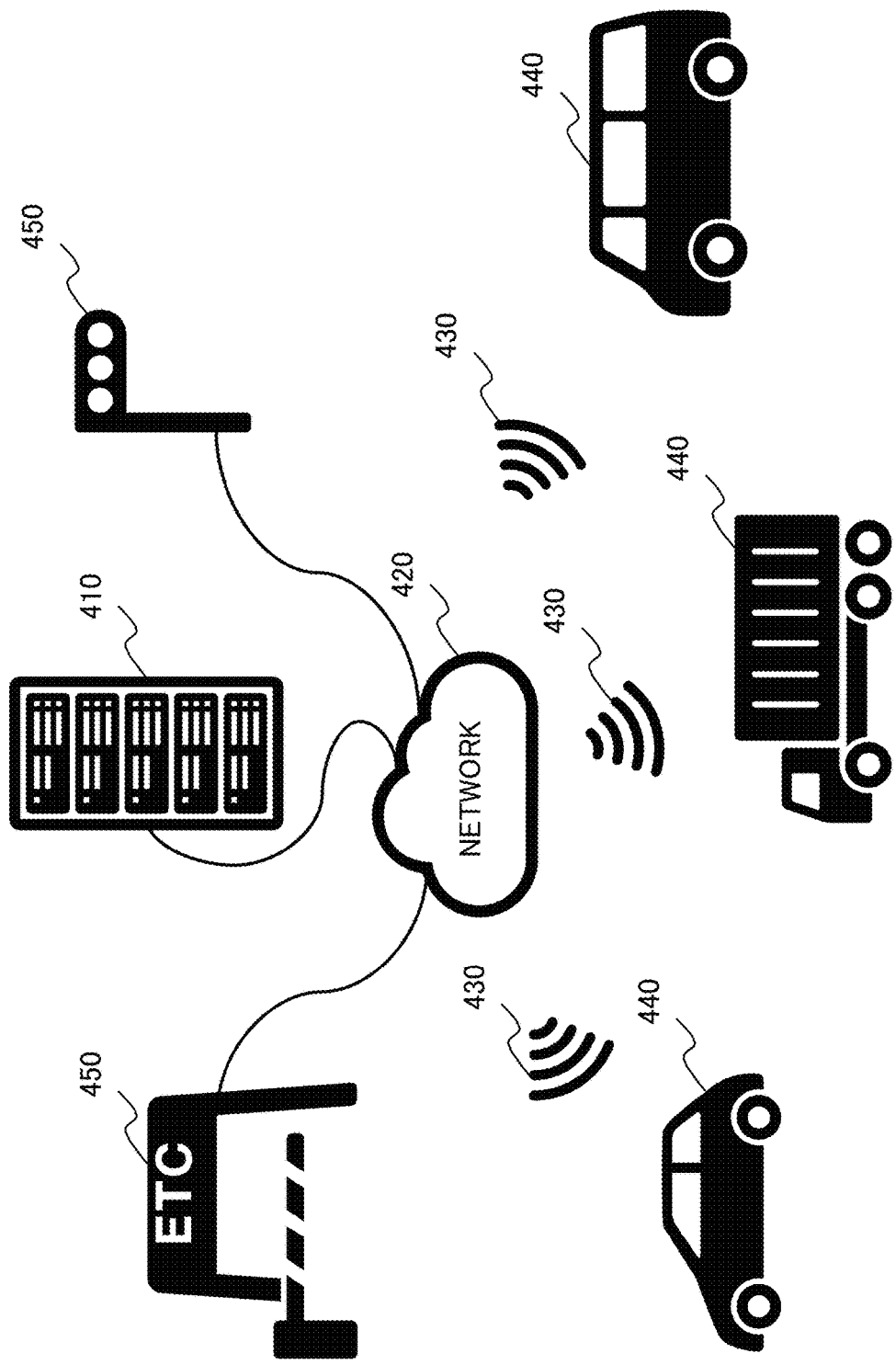

DETERIORATION DIAGNOSIS DEVICE, DETERIORATION DIAGNOSIS METHOD, AND RECORDING MEDIUM

This application is a National Stage Entry of PCT/JP2021/005687 filed on Feb. 16, 2021, which claims priority from Japanese Patent Application 2020-045357 filed on Mar. 16, 2020, the contents of all of which are incorporated herein by reference, in their entirety.

TECHNICAL FIELD

The present invention relates to a diagnosis using an image, and particularly to a diagnosis of deterioration.

BACKGROUND ART

Structures such as a road surface of a road, a sign installed on a road side, and a ceiling and a side wall such as a tunnel deteriorate over time.

Therefore, a device for measuring deterioration of a structure or the like has been proposed (see, for example, PTL 1).

The information processing system described in PTL 1 detects a situation of a road by using a rotation speed of a wheel.

However, the detection using the wheel cannot detect the state of the road surface on which the wheel does not pass. In recent years, the size and price of an imaging device such as a camera have become reasonable.

Therefore, deterioration is measured using an image captured by a camera (see, for example, PTL 2).

The information processing apparatus described in PTL 2 calculates deterioration degree of a structure based on a captured image of the structure. Then, the information processing apparatus described in PTL 2 calculates the necessity of additional measurement based on the deterioration degree calculated at a plurality of times.

CITATION LIST

Patent Literature

[PTL 1] JP 2019-049952 A
[PTL 2] JP 2018-031664 A

SUMMARY OF INVENTION

Technical Problem

Images used for a diagnosis of deterioration are captured in various situations.

For example, in a case where an image is captured in a state where illumination light is poor such as midnight, the entire image including a deteriorated portion is in a black state. Therefore, the diagnosis of deterioration using the image has low accuracy.

Alternatively, in a case where an image is captured on a sunny day, a shadow that adversely affects the diagnosis of deterioration such as a crack is easily imaged. Therefore, in this case, the diagnosis of deterioration using the image has low accuracy.

As described above, the accuracy of the diagnosis of deterioration using the image changes according to the situation in which the image is captured. That is, the reliability of the diagnosis of deterioration using the image changes according to the state of the image, and thus differs for each image.

Therefore, it is desired to provide the reliability of the deterioration diagnosis to the user using the result of the deterioration diagnosis using the image.

The information processing apparatus described in PTL 2 determines the necessity by using the deterioration degree at a plurality of measurement times. That is, the information processing apparatus described in PTL 2 is a technique for evaluating deterioration of a structure to be diagnosed by using a plurality of items of deterioration degree for a certain period. Therefore, the information processing apparatus described in PTL 2 cannot provide reliability of a deterioration diagnosis using an individual image.

Since the information processing system described in PTL 1 is not a technique related to an image, it is not possible to provide reliability of a deterioration diagnosis using an individual image.

As described above, the techniques described in PTLs 1 and 2 have an issue that the reliability of a deterioration diagnosis using an image cannot be provided.

An object of the present invention is to solve the above issues and provide a deterioration diagnosis device or the like that provides reliability of a diagnosis of deterioration by using an image.

Solution to Problem

A deterioration diagnosis device according to an example aspect of the present invention includes: a memory; and at least one processor coupled to the memory. The processor performs operations. The operations include: acquiring an image including a portion to be diagnosed in a structure; calculating, by using the image, deterioration degree that is a degree of deterioration of the portion; calculating reliability for the deterioration degree based on imaging information that is information related to capturing of the image; and outputting the deterioration degree and the reliability in association with each other.

A deterioration diagnosis system according to an example aspect of the present invention includes: the above deterioration diagnosis device; an imaging device that transmits an image to the deterioration diagnosis device; and a display device that displays deterioration degree and reliability output by the deterioration diagnosis device in association with each other.

A deterioration diagnosis method according to an example aspect of the present invention includes: acquiring an image including a portion to be diagnosed in a structure; calculating deterioration degree that is a degree of deterioration of the portion using the image; calculating reliability for deterioration degree based on imaging information that is information related to capturing of the image; and outputting the deterioration degree and the reliability in association with each other.

A non-transitory computer-readable recording medium according to an example aspect of the present invention embodies a program. The program causes a computer to performs a method. The method includes: acquiring an image including a portion to be diagnosed in a structure; calculating deterioration degree that is a degree of deterioration of the portion using the image; calculating reliability for deterioration degree based on imaging information that is information related to capturing of the image; and outputting the deterioration degree and the reliability in association with each other.

Advantageous Effects of Invention

According to the present invention, it is possible to achieve an effect of providing reliability of a deterioration diagnosis using an image.

BRIEF DESCRIPTION OF DRAWINGS

FIG. 11 is a diagram illustrating an outline of an ITS.

EXAMPLE EMBODIMENT

Figure 1:
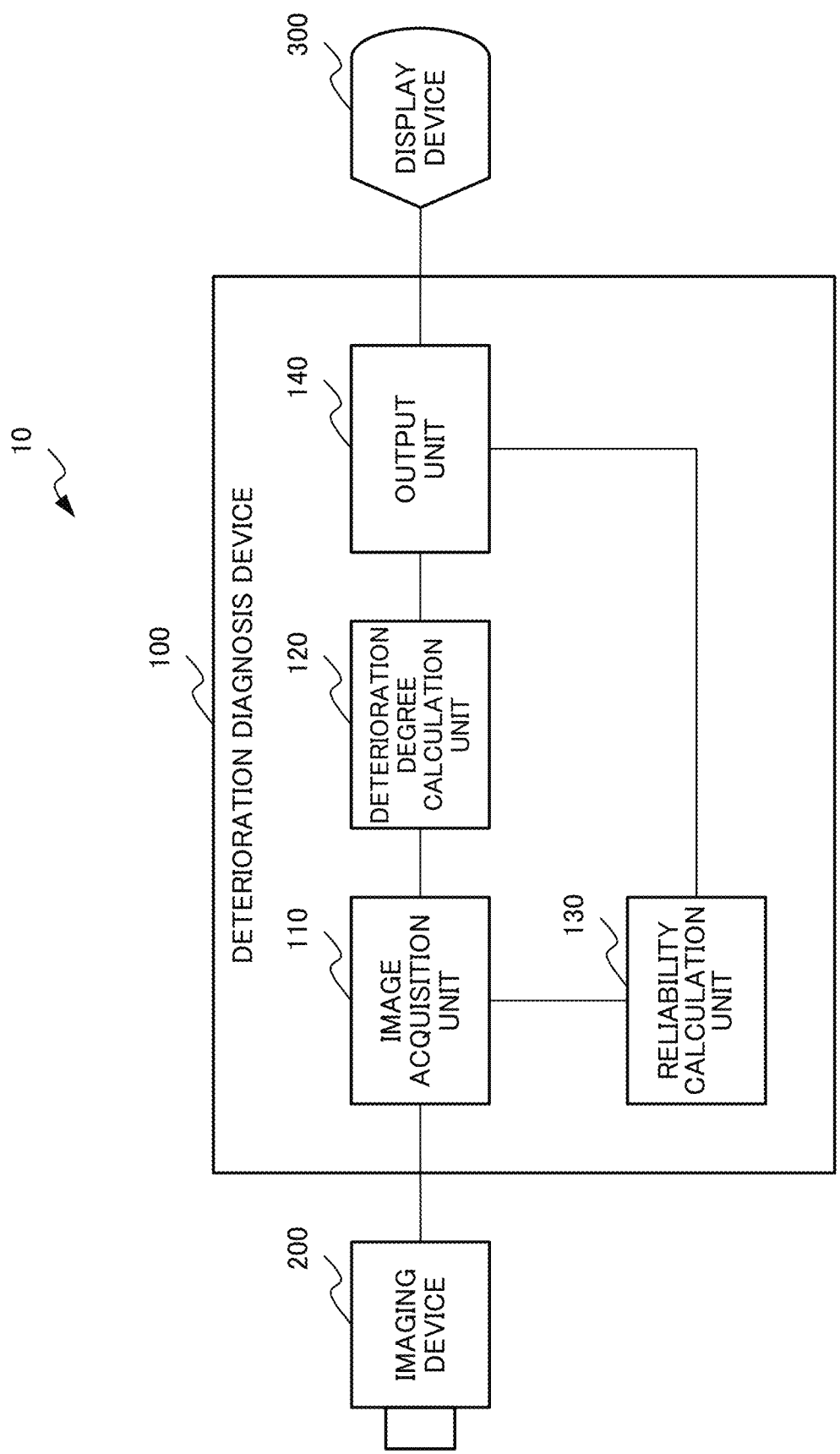
FIG. 1 is a block diagram illustrating an example of a configuration of a deterioration diagnosis system including a deterioration diagnosis device according to a first example embodiment.

Next, an example embodiment of the present invention will be described with reference to the drawings.

Each drawing is for describing an example embodiment of the present invention. However, the present invention is not limited to the description of each drawing. Similar configurations in the respective drawings are denoted by the same reference numerals, and repeated description thereof may be omitted. In the drawings used in the following description, the description of portions not related to the description of the present invention may be omitted and not illustrated.

Terms

First, terms used for description of the present example embodiment will be described.

The "deterioration degree" is a result (for example, a degree of deterioration) of a deterioration diagnosis in a portion to be diagnosed in a structure. In the following description, a numerical value is used as the "deterioration degree". However, as the deterioration degree, a level other than a numerical value may be used. For example, characters such as {small, medium, large} may be used as the deterioration degree.

In each example embodiment, the deterioration degree of each portion is calculated by applying a predetermined analysis method to an image including a portion to be diagnosed in a structure (for example, a road surface, a sign, and a ceiling and a side wall of a tunnel or the like).

However, in each example embodiment, the deterioration degree may be calculated not for each portion but for the entire structure.

The deterioration degree value has any range.

For example, each example embodiment may use a crack rate of a road surface as the deterioration degree. In this case, the value of the deterioration degree is in the range of 0.0 to 1.0 (0% to 100%).

Alternatively, each example embodiment may use a rut amount as the deterioration degree. In this case, the value of the deterioration degree is generally an integer of 0 or more (unit is mm). A rational number may be used as the value of the rut amount.

Alternatively, in each example embodiment, an International Roughness Index (IRI) may be used as the deterioration degree. In this case, the value of the deterioration degree is a rational number of 0 or more (unit is mm/m).

As described above, the value of the deterioration degree has any range. The user of each example embodiment may appropriately select the deterioration degree according to the target deterioration.

In the following description, a crack rate will be used as an example of the deterioration degree.

In the following description, the value of the deterioration degree increases when the deterioration has worsened. However, as the value of the deterioration degree, a numerical value such that the value decreases when the deterioration has worsened may be used in relation to processing using the deterioration degree.

The "reliability" is a degree of reliability for the calculated deterioration degree. More specifically, in each example embodiment, the reliability is a value calculated based on the degree of whether the image used for calculating the deterioration degree is an image suitable for calculating the deterioration degree.

In order to analyze the image and calculate the deterioration degree, it is desirable that the image is suitable for analysis. The state of capturing an image is a major factor in whether the image used for analysis is an image suitable for analysis. Therefore, in each example embodiment described below, as an example, the reliability is calculated based on information about the imaging situation (hereinafter, referred to as "imaging information"). However, the value of the reliability is not limited to the value calculated based on the imaging information.

In the following description, the value of the reliability is in a range of 0.0 to 1.0 (0% to 100%). However, this is an example. Each example embodiment may use a different value range of reliability.

In the following description, the value of the reliability is higher when the deterioration degree is more reliable. However, as the reliability, a numerical value such that the value increases when the reliability is not reliable may be used in a relationship of processing using the reliability.

First Example Embodiment

Hereinafter, a first example embodiment will be described with reference to the drawings.

Description of Configuration

First, a configuration of a deterioration diagnosis device 100 according to a first example embodiment will be described with reference to the drawings.

FIG. 1 is a block diagram illustrating an example of a configuration of a deterioration diagnosis system 10 including the deterioration diagnosis device 100 according to a first example embodiment.

The deterioration diagnosis system 10 includes the deterioration diagnosis device 100, an imaging device 200, and a display device 300.

The imaging device 200 captures an image including a portion to be diagnosed in a structure (for example, a road surface, a sign, a ceiling, and/or a side wall).

The deterioration diagnosis system 10 can include any device as the imaging device 200 as long as the device can acquire an image including a portion to be diagnosed. For example, the deterioration diagnosis system 10 may include, as the imaging device 200, a drive recorder installed for the purpose of recording the situation at the time of occurrence of an automobile accident. Alternatively, the deterioration diagnosis system 10 may include, as the imaging device 200, a camera (for example, an omnidirectional camera) that captures a scene.

Alternatively, the imaging device 200 may be an imaging device mounted on a vehicle used in an intelligent transport system (ITS) or the like. The intelligent transportation system (ITS) is a transport system using information technology (IT).

FIG. 11 is a diagram illustrating an outline of an ITS.

An information processing apparatus 410 collects information from a vehicle 440 via a network 420 and/or a communication path 430. Then, the information processing apparatus 410 controls a facility 450 installed on a road or the like based on the collected information and executes a predetermined process (for example, assistance of safe driving or management of roads). The facility 450 is any facility. FIG. 16 illustrates a traffic light and an electronic toll collection system (ETC in FIG. 11) as an example of the facility 450.

Alternatively, the deterioration diagnosis system 10 may include, as the imaging device 200, a camera used for automatic driving of a vehicle or the like. As described above, the deterioration diagnosis system 10 may be used in an automatic driving system.

The description returns to the description with reference to FIG. 1.

Then, the imaging device 200 transmits the captured image to the deterioration diagnosis device 100. The imaging device 200 may transmit at least part of the imaging information in addition to the captured image to the deterioration diagnosis device 100.

The deterioration diagnosis device 100 may include the imaging device 200.

The display device 300 displays an output (at least the deterioration degree and the reliability) of the deterioration diagnosis device 100 to be described later.

The deterioration diagnosis system 10 can include any device as the display device 300 as long as the device can display the output of the deterioration diagnosis device 100. For example, the deterioration diagnosis system 10 may include, as the display device 300, a display device included in a system that manages repair and repair of a road. Alternatively, the deterioration diagnosis system 10 may include, as the display device 300, display equipment (for example, the liquid crystal display of a terminal) of a terminal device carried by the user.

The deterioration diagnosis device 100 may include the display device 300. For example, the display device 300 may be a liquid crystal display, an organic electroluminescence display, or electronic paper.

The deterioration diagnosis device 100 acquires an image from the imaging device 200. Then, the deterioration diagnosis device 100 calculates the deterioration degree of the portion to be diagnosed included in the image. Further, the deterioration diagnosis device 100 calculates the reliability related to the calculated deterioration degree. Then, the deterioration diagnosis device 100 outputs the deterioration degree and the reliability in association with each other.

Next, a configuration of the deterioration diagnosis device 100 will be described.

The deterioration diagnosis device 100 includes an image acquisition unit 110, a deterioration degree calculation unit 120, a reliability calculation unit 130, and an output unit 140.

The image acquisition unit 110 acquires an image including a portion to be diagnosed in the structure (for example, a road surface of a road, or a side wall and a ceiling of a tunnel). The image acquisition unit 110 may acquire information (hereinafter, referred to as "location information") regarding the position of the portion to be diagnosed. The location information is, for example, latitude and longitude. The location information may include a direction of the portion.

The deterioration degree calculation unit 120 calculates the deterioration degree of the portion to be diagnosed included in the image using a predetermined method. A method used by the deterioration degree calculation unit 120 to calculate the deterioration degree is any method. For example, the deterioration degree calculation unit 120 calculates the area of the road surface and the area of the crack included in the image by using predetermined image recognition. Then, the deterioration degree calculation unit 120 calculates a crack rate of the road surface as the deterioration degree based on the area of the crack and the area of the road surface calculated.

The deterioration degree calculation unit 120 may calculate the deterioration degree by using predetermined machine learning or artificial intelligence.

The image may include a plurality of portions to be diagnosed. In this case, the deterioration degree calculation unit 120 may calculate the deterioration degree for all the portions. Alternatively, the deterioration degree calculation unit 120 may calculate the deterioration degree for some portions according to a predetermined selection rule.

The reliability calculation unit 130 calculates the reliability by using the imaging information.

The imaging information used to calculate the reliability is any information. For example, the user of the deterioration diagnosis device 100 may select information used for calculation of the reliability by using past knowledge or experimental results.

For example, when the deterioration diagnosis system 10 includes an in-vehicle camera as the imaging device 200, the deterioration diagnosis device 100 can use the following information as the imaging information.

(1) Information about the imaging environment: weather, imaging time, latitude/longitude of the imaging location, and the like.
(2) Information about movement: moving speed and acceleration (front and back, left and right, up and down).
(3) Information about the vehicle amount on which the imaging device 200 is mounted: vehicle type (large automobile, medium automobile, ordinary automobile, small automobile, light automobile), driving engine (gasoline vehicle or electric vehicle), mounting object (mounting amount of fuel, etc.).

(4) Information about image capturing: a height and a direction at which the imaging device 200 is installed, the number of pixels, a frame rate, a shutter speed, a diaphragm, and the like.
(5) Information about the portion to be diagnosed: traffic volume, lane, straight line/curve, flat/slope, structure of road (tunnel/grade intersection), structure of road surface (manhole, road marking, and the like), and type of pavement of road surface (asphalt, concrete, or the like).
(6) Surrounding information: surrounding structures (for example, a street of buildings in a city, or a cultivated land in an urban area) and terrain (mountainous area or plain).

The source of the imaging information is any source.

The deterioration diagnosis device 100 may acquire the imaging information using the acquired image. For example, the deterioration diagnosis device 100 may detect a lane or the like by applying predetermined image recognition processing to the acquired image.

Alternatively, the deterioration diagnosis device 100 may acquire imaging information from a predetermined device. For example, in a case where the imaging device 200 is a drive recorder, the deterioration diagnosis device 100 may acquire imaging information such as imaging time from the imaging device 200. Alternatively, the deterioration diagnosis device 100 may acquire information such as a speed, an acceleration, and a vehicle type from a vehicle equipped with a drive recorder.

Alternatively, the deterioration diagnosis device 100 may acquire imaging information (for example, weather) from an external system (not illustrated) via a predetermined communication path.

Then, the reliability calculation unit 130 calculates the reliability based on the imaging information.

A method of calculating the reliability is any method.

For example, the reliability may be a value related to the imaging information.

For example, when weather is used as the imaging information, the reliability calculation unit 130 may use the following reliability.

Reliability in the case of fine weather=50%
Reliability in the case of cloudy weather=100%
Reliability in the case of rain=0%

The reliability calculation unit 130 may calculate the reliability by using a plurality of pieces of imaging information.

For example, the time zone in the vicinity of the time when the sun is in the south is a time zone that is not suitable for capturing an image used for a diagnosis of deterioration. From sunset to sunrise is a time zone not suitable for capturing an image used for a diagnosis of deterioration. That is, the imaging time is one piece of imaging information having a large influence on the reliability of the calculated deterioration degree.

When the moving speed of the imaging device 200 is high, the image tends to be unclear. Alternatively, in a case where the vibration of the imaging device 200 is large (alternatively, in a case where the change in acceleration is large), the image tends to be unclear due to blurring or the like.

Therefore, the reliability calculation unit 130 may use the following reliability. In the description of the present example embodiment, the value of the reliability is 0.0 to 1.0 (0% to 100%). Therefore, the reliability for each piece of imaging information in the following formula is reliability normalized in the range of 0.0 to 1.0.

Reliability=reliability of weather×reliability of time zone×max(reliability of speed,reliability of acceleration)

where max ( ) is a function that outputs the larger value in parentheses.

As the imaging information for calculating the reliability, the above reliability includes the weather at the time of capturing the image, the time of capturing the image, and at least one of the moving speed and the acceleration of the imaging device that captures the image.

Alternatively, the reliability calculation unit 130 may calculate the reliability by using predetermined machine learning or artificial intelligence.

Furthermore, the reliability calculation unit 130 may exclude an influence of a structure on a road surface that is not deteriorated by using predetermined machine learning or artificial intelligence. For example, the reliability calculation unit 130 may detect a structure (for example, manholes and/or road markings) on the road surface by using the image, and calculate the reliability obtained by correcting the influence of the structure.

Alternatively, the reliability calculation unit 130 may select imaging information to be used for calculation of the reliability for at least some images based on an instruction from the user.

In general, repair of a road is performed on a road in a predetermined section (for example, a section from an intersection to an intersection). On the other hand, the portion to be diagnosed by the deterioration diagnosis device 100 is often narrower than the repair section. Therefore, the reliability calculation unit 130 may calculate the reliability for a predetermined section (for example, a section from one intersection to the next intersection) using the reliability for a plurality of portions. For example, the reliability calculation unit 130 may set an average value of the reliability of the portion included in the section as the reliability of the section.

Similarly, the deterioration degree calculation unit 120 may calculate the deterioration degree for a predetermined section. For example, the deterioration degree calculation unit 120 may set an average value of the deterioration degree of a portion included in the section as the deterioration degree of the section.

Another configuration may calculate the deterioration degree and the reliability in a predetermined section. For example, the output unit 140 may calculate the deterioration degree and the reliability in a predetermined section.

The output unit 140 outputs the deterioration degree and the reliability in association with each other. For example, the output unit 140 outputs the deterioration degree and the reliability to the display device 300. However, the output unit 140 may output the deterioration degree and the reliability to another device. For example, the output unit 140 may output the deterioration degree and the reliability in association with each other to a storage device (not illustrated).

When the output unit 140 outputs the deterioration degree and the reliability to the display device 300, the display device 300 displays the deterioration degree and the reliability output by the deterioration diagnosis device 100.

The output unit 140 may further output the location information of the portion in association with the deterioration degree and the reliability to be output. In this case, the display device 300 may display the deterioration degree and the reliability by using the location information related to the received portion.

Alternatively, the display device 300 may collectively display the deterioration degree and the reliability of the portions included in the predetermined section. For example, the display device 300 may display the maximum deterioration degree of the portion included in the predetermined section (for example, a section from one intersection to the next intersection) and the reliability related to the maximum deterioration degree.

Figure 2:
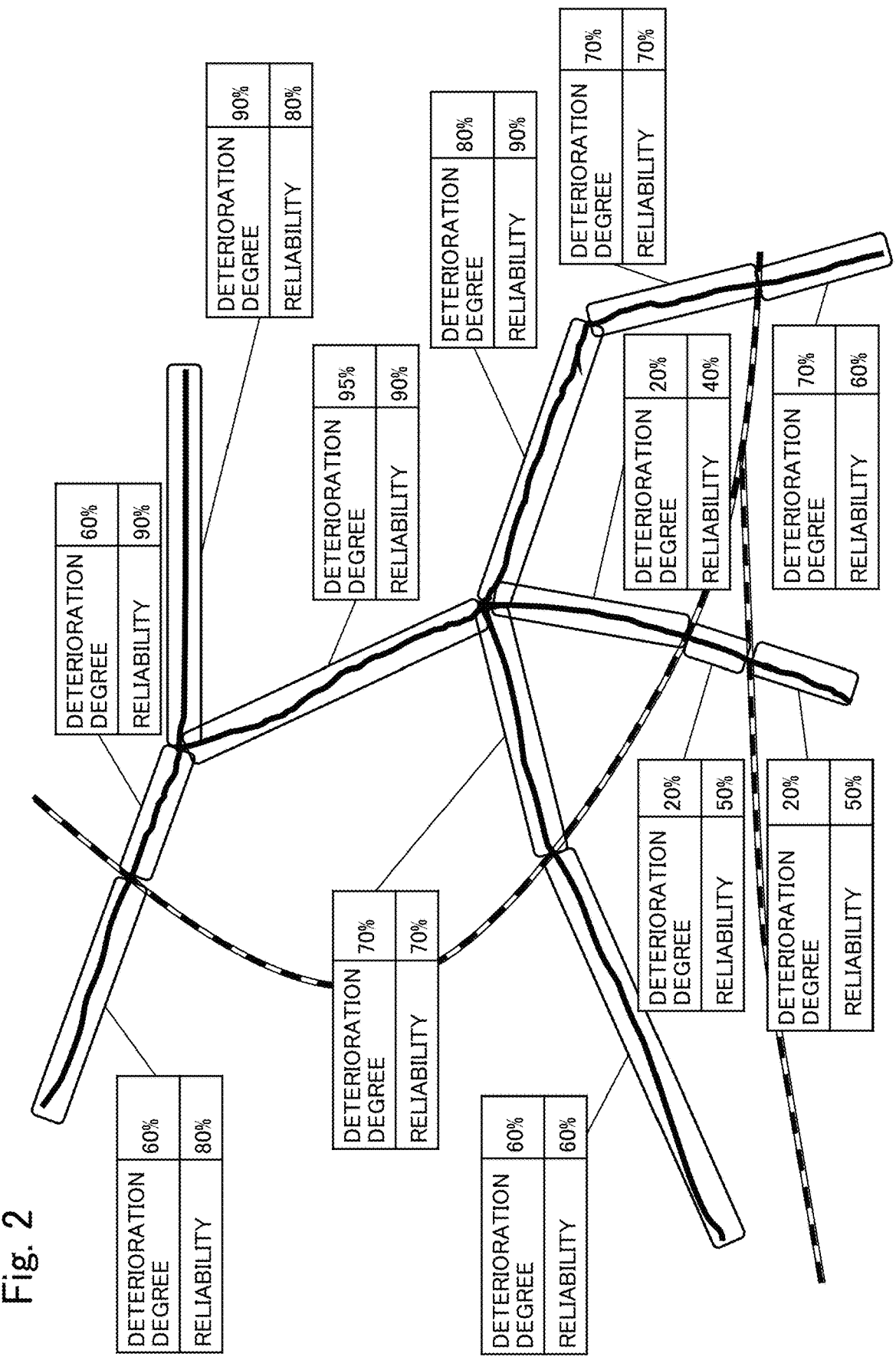
FIG. 2 is a diagram illustrating an example of display of deterioration degree and reliability.

FIG. 2 is a diagram illustrating an example of display of the deterioration degree and the reliability. FIG. 2 illustrates an example of a case where the reliability for a predetermined section is displayed.

Furthermore, the display device 300 may display the reliability based on an instruction from a user or the like.

Figures 3, 4:
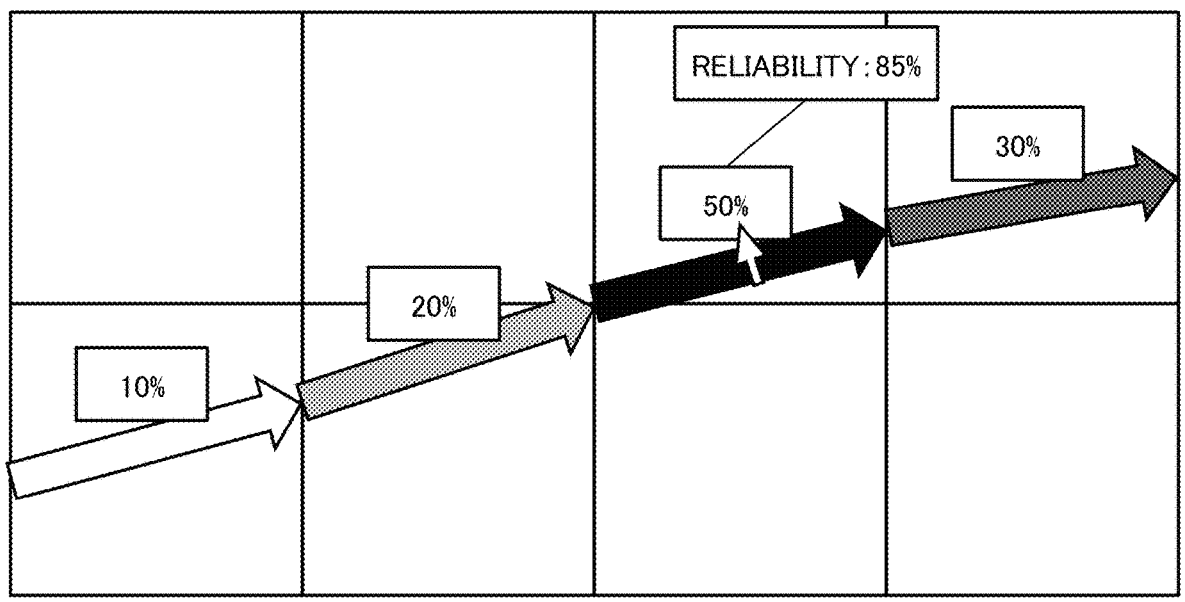
FIG. 3 is a diagram illustrating an example of display of deterioration degree calculated by the deterioration diagnosis device.
FIG. 4 is a diagram illustrating an example of a plurality of items of deterioration degree and reliability for each item.

FIG. 3 is a diagram illustrating an example of display of the deterioration degree calculated by the deterioration diagnosis device 100.

In FIG. 3, each rectangle (for example, 100 m rectangle) indicates a unit diagnosed by the deterioration diagnosis device 100.

Further, each arrow indicates a deterioration state diagnosed by the deterioration diagnosis device 100. A numerical value indicated at each arrow is the deterioration degree calculated by the deterioration diagnosis device 100. Furthermore, the color of each arrow relates to the deterioration degree. In FIG. 3, the higher the deterioration degree, the darker the color of the arrow.

However, FIG. 3 is an example of display of the deterioration degree in the display device 300. The display of the display device 300 is not limited to FIG. 3. The display device 300 may use another display as the display of the deterioration degree. For example, the display device 300 may use a symbol or a figure related to the deterioration degree.

Further, the display device 300 may display the reliability related to the operation of the user. For example, the display device 300 may display the reliability related to the deterioration degree overlapped by the mouse pointer moving according to the user's mouse operation.

FIG. 3 illustrates, as an example, the reliability (85%) related to the deterioration degree (50%) overlapped by the mouse pointer (white arrow).

Further, the deterioration diagnosis device 100 may calculate the reliability for a plurality of items of deterioration. For example, the deterioration diagnosis device 100 may calculate, as the reliability for deterioration degree, the reliability for each of the IRI, the crack rate, and the rut amount.

FIG. 4 is a diagram illustrating an example of a plurality of items of deterioration degree and reliability for each item. FIG. 4 illustrates a case where an IRI, a crack rate, and a rut amount are used as deterioration. For example, the display device 300 may display the deterioration degree and the reliability for a plurality of items of deterioration as illustrated in FIG. 4 as the deterioration degree and the reliability of each section illustrated in FIG. 2.

The output unit 140 may output at least part of the imaging information in addition to the deterioration degree and the reliability. For example, the output unit 140 may output location information in addition to the deterioration degree and the reliability. In this case, the display device 300 may display the deterioration degree and/or the reliability at, for example, an appropriate position on the map using the location information.

When the reliability calculation unit 130 detects a structure (for example, a manhole) on the road surface, the output unit 140 may output information about the detected structure. In this case, the display device 300 may display the detected structure in addition to the deterioration degree and the reliability. By referring to the displayed structure (for example, a manhole) in addition to the deterioration degree and the reliability, the user can determine whether the deterioration degree and the reliability are influenced by the structure.

For example, the manhole is different from the surrounding road surface in the deterioration occurring. For example, a manhole may rise up from or sink into a surrounding road surface. In this case, even when the road surface around the manhole is flat, vibration occurs when the vehicle passes on the manhole. As a result, the reliability may be calculated to be low. That is, the reliability may be lowered in the vicinity of the manhole regardless of the deterioration state of the road surface. As described above, the reliability may change due to a factor other than the image capturing condition.

Therefore, the display device 300 may display the position of the structure (for example, a manhole) on the road surface and the type of the structure detected by the deterioration diagnosis device 100 in addition to the deterioration degree and the reliability. In this case, the user can grasp whether the reliability is affected by the structure by referring to the displayed structure.

Description of Operation

Next, an operation of the deterioration diagnosis device 100 according to the first example embodiment will be described with reference to the drawings.

Figure 5:
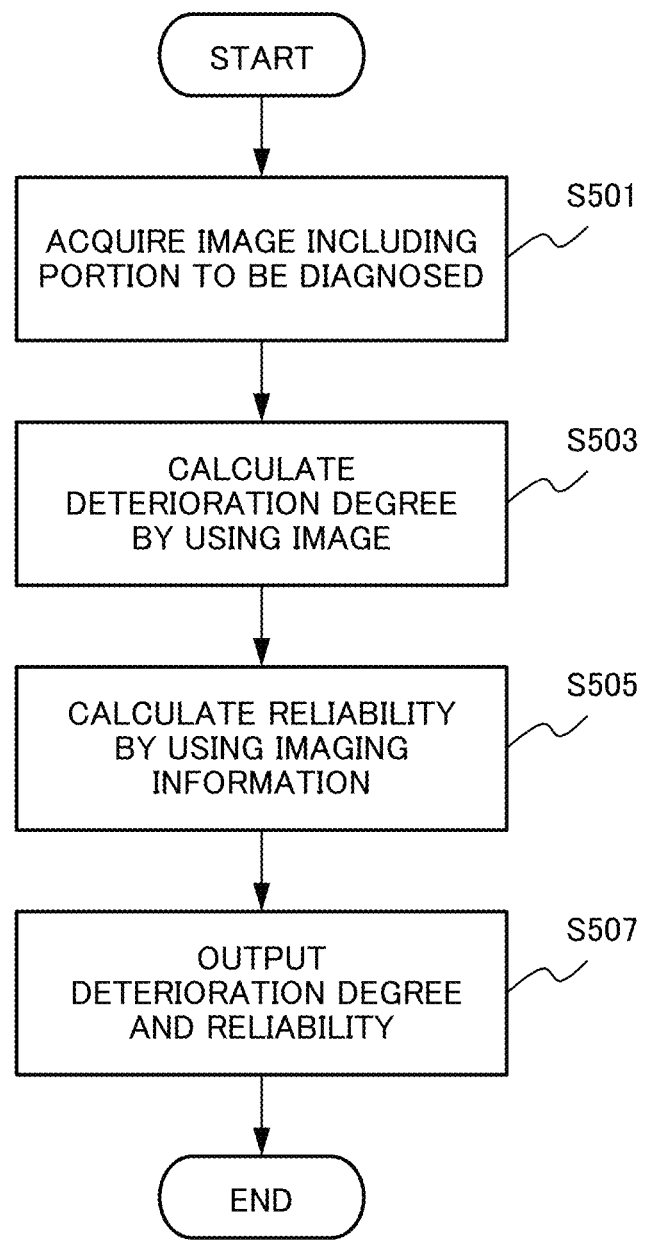
FIG. 5 is a flowchart illustrating an example of operation of the deterioration diagnosis device.

FIG. 5 is a flowchart illustrating an example of the operation of the deterioration diagnosis device 100.

The image acquisition unit 110 acquires an image including a portion to be diagnosed (step S501).

The deterioration degree calculation unit 120 calculates the deterioration degree of the portion to be diagnosed by using the image (step S503).

The reliability calculation unit 130 calculates the reliability for deterioration degree by using the imaging information (step S505).

The output unit 140 outputs the deterioration degree and the reliability in association with each other (step S507).

By using the operation as described above, the deterioration diagnosis device 100 outputs the deterioration degree and the reliability.

Description of Effects

Next, effects of the deterioration diagnosis device 100 according to the first example embodiment will be described.

The deterioration diagnosis device 100 according to the first example embodiment can obtain an effect of providing reliability of deterioration diagnosis using an image.

The reason is as follows.

The deterioration diagnosis device 100 includes an image acquisition unit 110, a deterioration degree calculation unit 120, a reliability calculation unit 130, and an output unit 140. The image acquisition unit 110 acquires an image including a portion to be diagnosed in the structure. The deterioration degree calculation unit 120 calculates the deterioration degree that is a degree of deterioration of the portion, by using the image. The reliability calculation unit 130 calculates the reliability for deterioration degree based on imaging information that is information related to imaging of an image. The output unit 140 outputs the deterioration degree and the reliability in association with each other.

The deterioration degree calculation unit 120 calculates the deterioration degree of the portion to be diagnosed included in the image acquired by the image acquisition unit 110. Imaging information about an image has a large influence on reliability in a diagnosis of deterioration using the image. Therefore, the reliability calculation unit 130 calculates the reliability by using the imaging information of the image used for calculating the deterioration degree. Then, the output unit 140 outputs the deterioration degree and the reliability in association with each other.

In this manner, the deterioration diagnosis device 100 can provide the deterioration degree calculated based on the image and the reliability thereof.

Further, the deterioration diagnosis system 10 includes the imaging device 200 and the display device 300 in addition to the deterioration diagnosis device 100. The imaging device 200 acquires an image including a portion to be diagnosed to output the image to the deterioration diagnosis device 100. The display device 300 displays the deterioration degree and the reliability output from the deterioration diagnosis device 100 in association with each other. Therefore, the user of the deterioration diagnosis system 10 can easily grasp the reliability for the deterioration degree in addition to the deterioration degree of the portion to be diagnosed.

Hardware Configuration

Next, a hardware configuration of the deterioration diagnosis device 100 will be described.

Each component of the deterioration diagnosis device 100 may be configured by a hardware circuit.

Alternatively, in the deterioration diagnosis device 100, each component may be configured including a plurality of devices connected via a network.

Alternatively, in the deterioration diagnosis device 100, the plurality of components may be configured by one piece of hardware.

Alternatively, the deterioration diagnosis device 100 may be achieved as a computer device including a central processing unit (CPU), a read only memory (ROM), and a random access memory (RAM). In addition to the above configuration, the deterioration diagnosis device 100 may be achieved as a computer device including a network interface circuit (NIC). Furthermore, the deterioration diagnosis device 100 may be achieved as a computer device including a graphics processing unit (GPU) in order to speed up the deterioration diagnosis processing.

Figure 6:
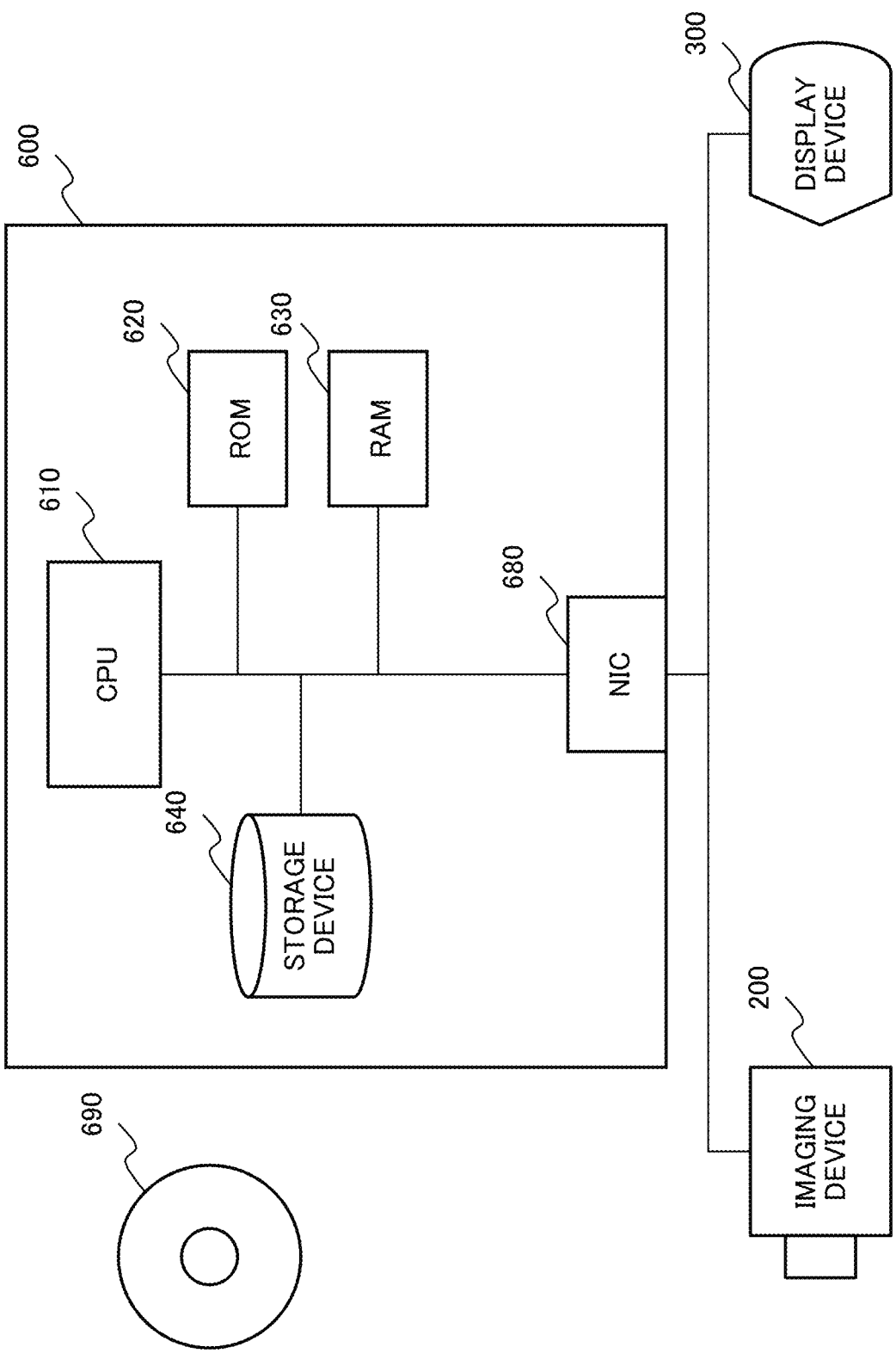
FIG. 6 is a block diagram illustrating an example of a hardware configuration of a deterioration diagnosis device.

FIG. 6 is a block diagram illustrating a configuration of an information processing apparatus 600 that is an example of a hardware configuration of the deterioration diagnosis device 100.

The information processing apparatus 600 includes a CPU 610, a ROM 620, a RAM 630, a storage device 640, and an NIC 680, and constitutes a computer device.

The CPU 610 reads a program from the ROM 620 and/or the storage device 640. Then, the CPU 610 controls the RAM 630, the storage device 640, and the NIC 680 based on the read program. Then, the computer including the CPU 610 controls these configurations and achieves functions as the image acquisition unit 110, the deterioration degree calculation unit 120, the reliability calculation unit 130, and the output unit 140 illustrated in FIG. 1.

When achieving each function, the CPU 610 may include the RAM 630 or the storage device 640 as a temporary storage medium of the program.

The CPU 610 may read the program included in the storage medium 690 storing the program in a computer readable manner by using a storage medium reading device (not illustrated). Alternatively, the CPU 610 may receive a program from an external device (not illustrated) via the NIC 680, store the program in the RAM 630 or the storage device 640, and operate based on the stored program.

The ROM 620 stores programs executed by the CPU 610 and fixed data. The ROM 620 is, for example, a programmable ROM (P-ROM) or a flash ROM.

The RAM 630 temporarily stores programs and data executed by the CPU 610. The RAM 630 is, for example, a dynamic-RAM (D-RAM).

The storage device 640 stores data and programs to be stored for a long period of time by the information processing apparatus 600. The storage device 640 may operate as a temporary storage device of the CPU 610. The storage device 640 is, for example, a hard disk device, a magneto-optical disk device, a solid state drive (SSD), or a disk array device.

The ROM 620 and the storage device 640 are non-volatile (non-transitory) storage media. On the other hand, the RAM 630 is a volatile (transitory) storage medium. The CPU 610 can operate based on a program stored in the ROM 620, the storage device 640, or the RAM 630. That is, the CPU 610 can operate using a nonvolatile storage medium or a volatile storage medium.

The NIC 680 mediates transmission and reception of data between the information processing apparatus 600 and the imaging device 200 and between the information processing apparatus 600 and the display device 300. The NIC 680 is, for example, a local area network (LAN) card. Furthermore, the NIC 680 is not limited to use wired communication, but may use wireless communication.

The information processing apparatus 600 configured as described above can obtain effects similar to those of the deterioration diagnosis device 100.

The reason is that the CPU 610 of the information processing apparatus 600 can achieve a function similar to that of the deterioration diagnosis device 100 based on the program.

Second Example Embodiment

As a second example embodiment, an outline of the deterioration diagnosis device 100 according to the first example embodiment will be described.

Figure 7:
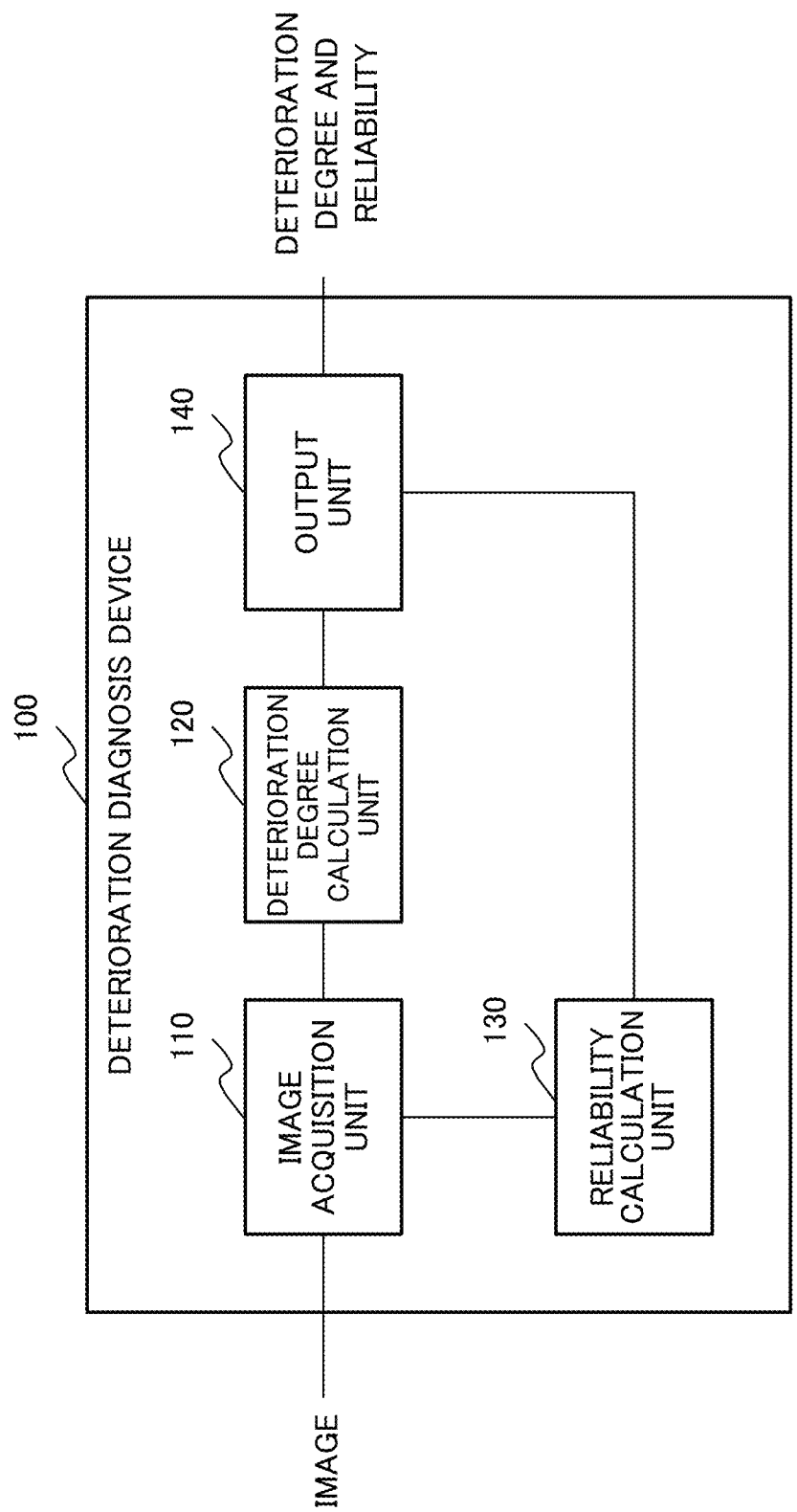
FIG. 7 is a block diagram illustrating a configuration of a deterioration diagnosis device according to a second example embodiment.

FIG. 7 is a block diagram illustrating a configuration of the deterioration diagnosis device 100 according to the second example embodiment that is an outline of the first example embodiment. The deterioration diagnosis device 100 according to the second example embodiment includes the same configuration as the deterioration diagnosis device 100 according to the first example embodiment.

The deterioration diagnosis device 100 includes an image acquisition unit 110, a deterioration degree calculation unit 120, a reliability calculation unit 130, and an output unit 140. The image acquisition unit 110 acquires an image including a portion to be diagnosed in the structure. The deterioration degree calculation unit 120 calculates the deterioration degree that is a degree of deterioration of the portion, by using the image. The reliability calculation unit 130 calculates the reliability for deterioration degree based on imaging information that is information related to imaging of an image. The output unit 140 outputs the deterioration degree and the reliability in association with each other.

The deterioration degree calculation unit 120 calculates the deterioration degree of the portion to be diagnosed included in the image acquired by the image acquisition unit 110. Imaging information about an image has a large influence on reliability in a diagnosis of deterioration using the image. Therefore, the reliability calculation unit 130 calculates the reliability by using the imaging information of the image used for calculating the deterioration degree. Then, the output unit 140 outputs the deterioration degree and the reliability in association with each other.

In this manner, the deterioration diagnosis device 100 can provide the deterioration degree calculated based on the image and the reliability thereof The deterioration diagnosis device 100 in FIG. 7 has a minimum configuration in the first example embodiment.

The deterioration diagnosis device 100 according to the second example embodiment may be achieved using a computer device as illustrated in FIG. 6 as in the first example embodiment.

Third Example Embodiment

Repair or the like is performed for a predetermined period of time. Therefore, the deterioration diagnosis system 10 desirably stores the diagnosis result (deterioration degree and reliability) of the deterioration diagnosis device 100. Therefore, as a third example embodiment, an example embodiment in a case where a diagnosis result is stored will be described.

First, a configuration of a deterioration diagnosis device 101 according to the third example embodiment will be described with reference to the drawings.

Figure 8:
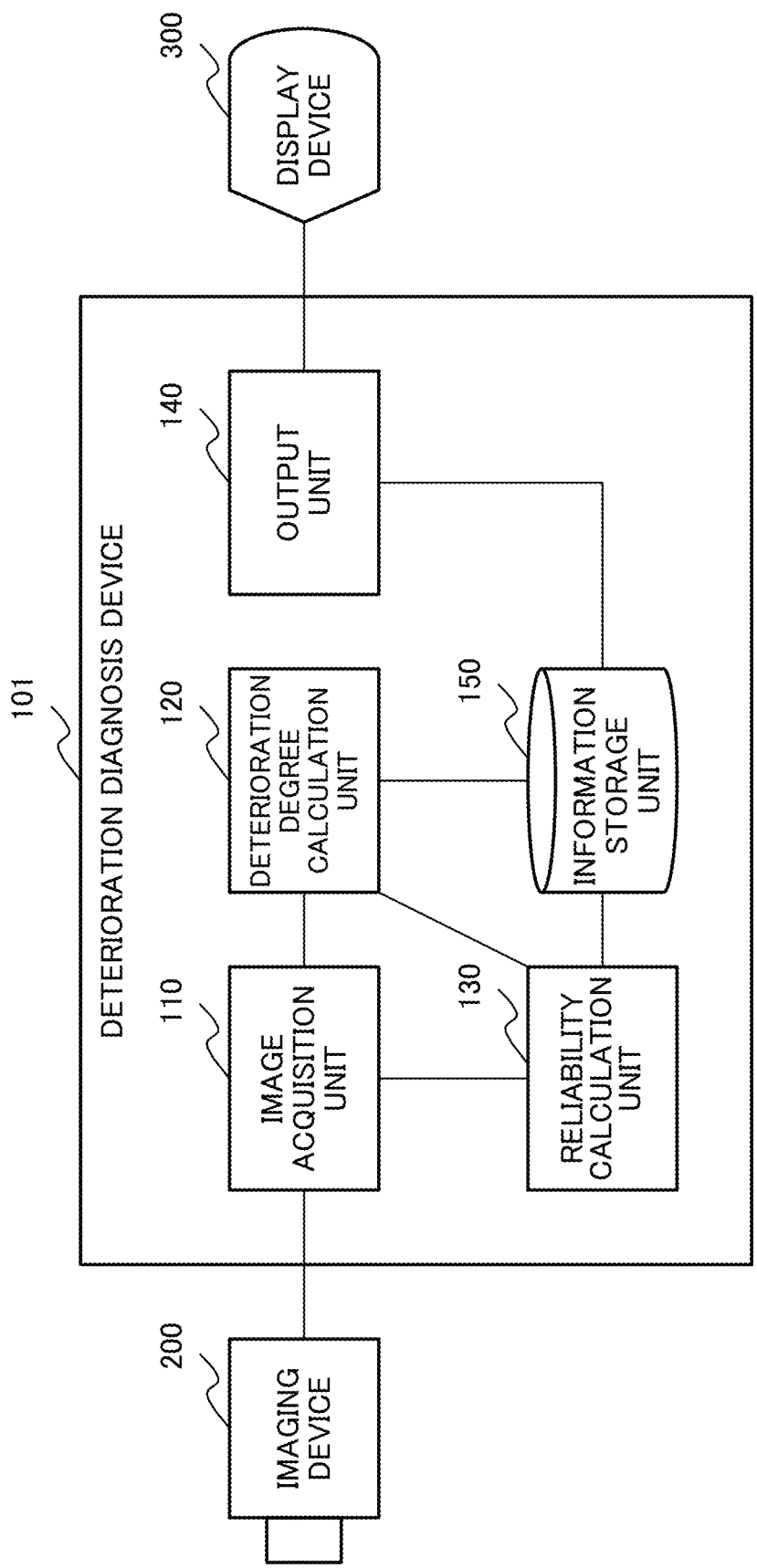
FIG. 8 is a block diagram illustrating an example of a configuration of a deterioration diagnosis system including a deterioration diagnosis device according to a third example embodiment.

FIG. 8 is a block diagram illustrating an example of a configuration of a deterioration diagnosis system 11 including the deterioration diagnosis device 101 according to the third example embodiment.

The deterioration diagnosis system 11 includes the deterioration diagnosis device 101, the imaging device 200, and the display device 300.

Since the imaging device 200 and the display device 300 are similar to those of the first example embodiment, detailed description thereof will be omitted.

The deterioration diagnosis device 101 includes an information storage unit 150 in addition to the configuration of the deterioration diagnosis device 100. Hereinafter, for convenience of description, description of similar configurations and operations of the first example embodiment will be appropriately omitted, and configurations and operations unique to the third example embodiment will be described.

The deterioration degree calculation unit 120 stores the calculated deterioration degree in the information storage unit 150.

The reliability calculation unit 130 stores the calculated reliability in the information storage unit 150.

The information storage unit 150 stores the deterioration degree and the reliability in association with each other. The information storage unit 150 may store at least part of the imaging information in addition to the deterioration degree and the reliability. Alternatively, the information storage unit 150 may store the deterioration degree and the reliability related to at least part of the imaging information in association with each other. For example, in a case where the imaging information includes the location information of the portion and the time of capturing the image, the information storage unit 150 may store the deterioration degree and the reliability in each portion as a history by using the imaging time. In this case, a device not illustrated may execute a predetermined process (for example, a time series data process) by using the deterioration degree and the reliability stored as the history.

Alternatively, the deterioration degree calculation unit 120 or the reliability calculation unit 130 may update the deterioration degree and the reliability stored in the information storage unit 150 based on a predetermined condition.

For example, the deterioration degree calculation unit 120 and the reliability calculation unit 130 may always store the calculated deterioration degree and reliability in the information storage unit 150. In this case, the information storage unit 150 stores the latest deterioration degree and reliability.

Alternatively, the deterioration degree calculation unit 120 and the reliability calculation unit 130 may cooperate to store the deterioration degree and the reliability in the information storage unit 150.

An example of the linkage operation will be described with reference to the drawings.

Figure 9:
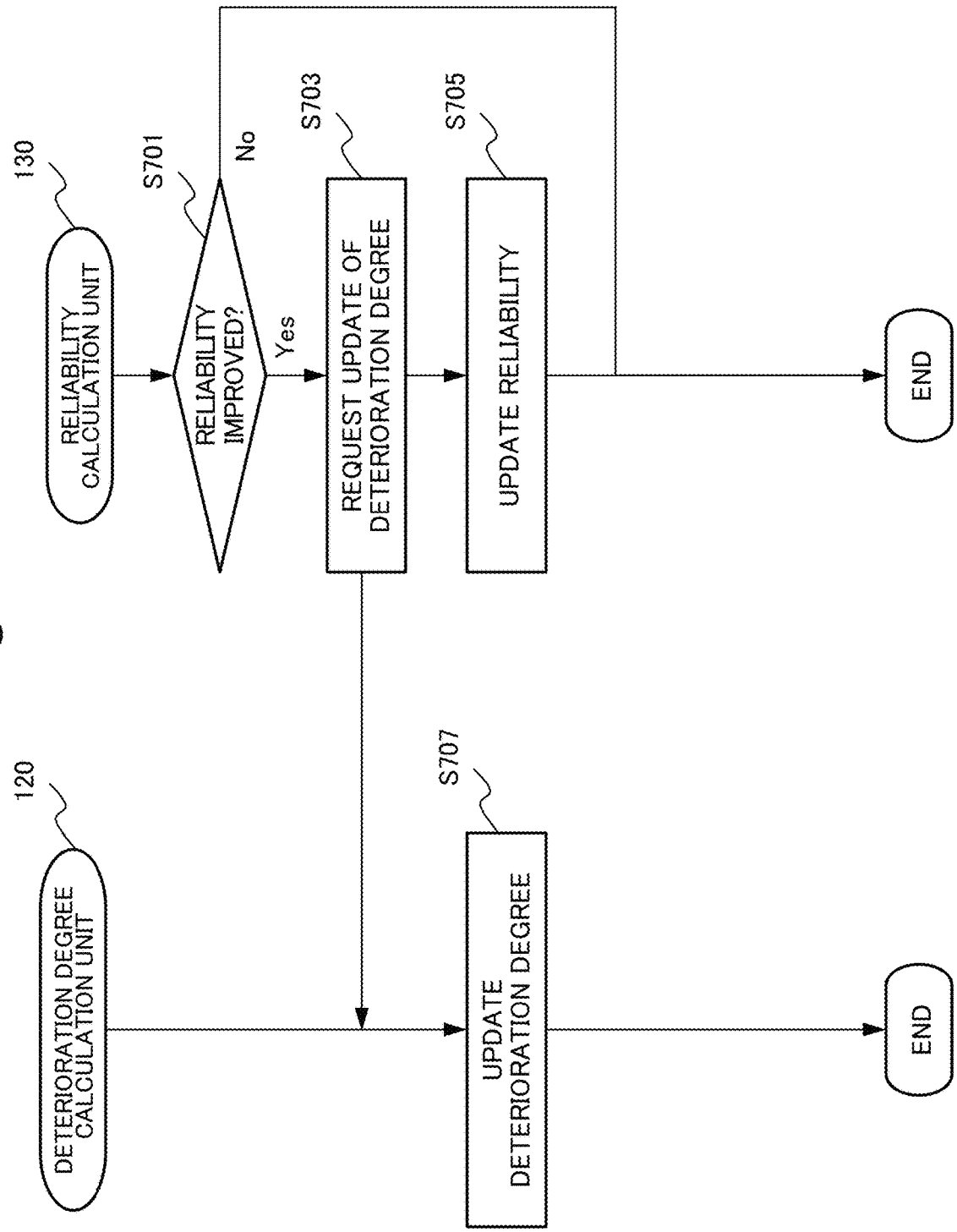
FIG. 9 is a sequence diagram for describing a first example of a linkage operation.

FIG. 9 is a sequence diagram for explaining a first example of the linkage operation. It is assumed that the deterioration degree calculation unit 120 and the reliability calculation unit 130 have calculated the deterioration degree and the reliability, respectively.

After calculating the reliability, the reliability calculation unit 130 determines whether the reliability has been improved (S701). Specifically, the reliability calculation unit 130 compares the stored reliability with the calculated reliability. When the calculated reliability is higher than the stored reliability, the reliability calculation unit 130 determines that the reliability is improved.

When it is not improved (No in S701), the deterioration diagnosis device 101 ends the process.

When it is improved (Yes in S701), the reliability calculation unit 130 requests the deterioration degree calculation unit 120 to update the deterioration degree (S703).

Then, the reliability calculation unit 130 updates the reliability stored in the information storage unit 150 with the calculated reliability (S705).

When the information storage unit 150 stores the reliability as a history, the reliability calculation unit 130 adds the calculated reliability to the history without updating the stored reliability.

Upon receiving the request from the reliability calculation unit 130, the deterioration degree calculation unit 120 updates the deterioration degree stored in the information storage unit 150 with the calculated deterioration degree (S707).

When the information storage unit 150 stores the deterioration degree as a history, the deterioration degree calculation unit 120 adds the calculated deterioration degree to the history without updating the stored deterioration degree.

Based on such an operation, the deterioration diagnosis device 101 can store the deterioration degree with high reliability.

Figure 10:
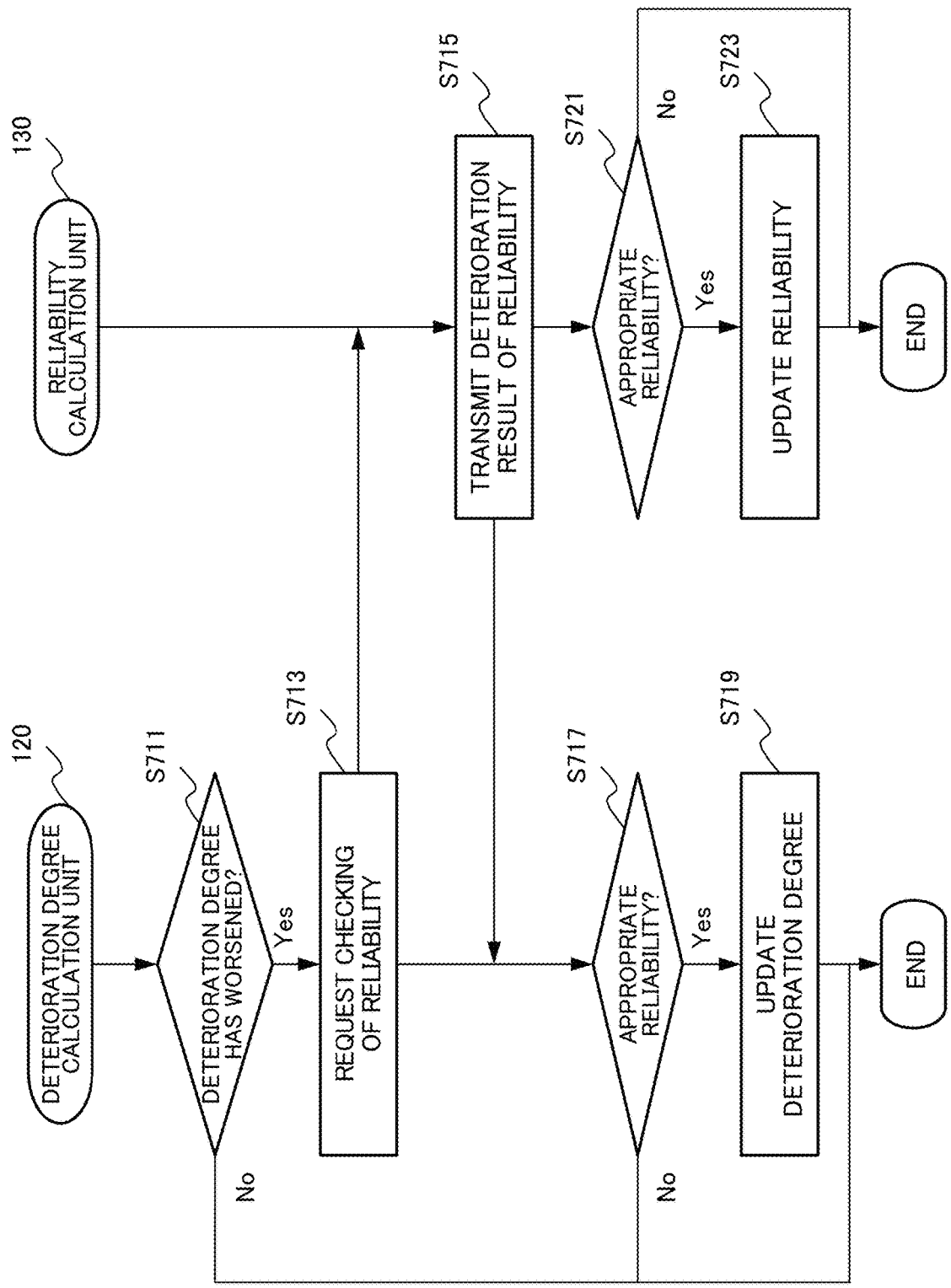
FIG. 10 is a sequence diagram for describing a second example of a linkage operation.

FIG. 10 is a sequence diagram for explaining a second example of the linkage operation. It is assumed that the deterioration degree calculation unit 120 and the reliability calculation unit 130 have calculated the deterioration degree and the reliability, respectively.

After calculating the deterioration degree, the deterioration degree calculation unit 120 determines whether the deterioration degree has worsened (S711). Specifically, the deterioration degree calculation unit 120 compares the stored deterioration degree with the calculated deterioration degree. Then, when the calculated deterioration degree is higher than the stored deterioration degree, the deterioration degree calculation unit 120 determines that the deterioration degree has worsened.

When the deterioration has not worsened (No in S711), the deterioration diagnosis device 101 ends the process.

When the deterioration has worsened (Yes in S711), the deterioration degree calculation unit 120 requests the reliability calculation unit 130 to check the reliability (S713).

The reliability calculation unit 130 determines whether the reliability is appropriate based on the request. Whether the reliability in the reliability calculation unit 130 is appropriate is appropriately determined.

For example, the reliability calculation unit 130 may determine that it is appropriate when the calculated reliability is higher than a predetermined threshold value. Alternatively, the reliability calculation unit 130 may determine that it is appropriate when the calculated reliability is the same as or higher than the stored reliability.

Then, the reliability calculation unit 130 transmits the determination result to the deterioration degree calculation unit 120 (S715).

When receiving the determination result, the deterioration degree calculation unit 120 determines whether the determination result of the reliability is "reliability is appropriate" (S717).

When the reliability is not appropriate (No in S717), the deterioration degree calculation unit 120 ends the process.

When the reliability is appropriate (Yes in S718), the deterioration degree calculation unit 120 updates the deterioration degree stored in the information storage unit 150 with the calculated deterioration degree.

When the information storage unit 150 stores the deterioration degree as a history, the deterioration degree calculation unit 120 adds the calculated deterioration degree to the history without updating the stored deterioration degree.

Then, the deterioration degree calculation unit 120 ends the process.

On the other hand, the reliability calculation unit 130 determines whether the calculated reliability is appropriate (S721).

When the reliability is not appropriate (No in S721), the reliability calculation unit 130 ends the process.

When the reliability is appropriate (Yes in S721), the reliability calculation unit 130 updates the reliability stored in the information storage unit 150 with the calculated reliability (S723).

When the information storage unit 150 stores the reliability as a history, the reliability calculation unit 130 adds the calculated reliability to the history without updating the stored reliability.

Based on such an operation, the deterioration diagnosis device 101 can store the deterioration degree when the deterioration degree has worsened and the reliability is appropriate.

As in the first example embodiment, the deterioration diagnosis device 101 may be achieved using a computer device as illustrated in FIG. 6.

Description of Effects

Next, effects of the deterioration diagnosis device 101 according to the third example embodiment will be described.

The deterioration diagnosis device 101 according to the third example embodiment can obtain an effect of storing more appropriate deterioration degree and reliability in addition to the effect of the first example embodiment.

The reason is as follows.

The information storage unit 150 stores the deterioration degree and the reliability. The reason is that the deterioration degree calculation unit 120 and/or the reliability calculation unit 130 compare the calculated deterioration degree and/or reliability with the stored deterioration degree and/or reliability, and store the appropriate deterioration degree and/or reliability.

Although the present invention is described above with reference to the example embodiments, the present invention is not limited to the above example embodiments. Various changes that can be understood by those skilled in the art can be made in the configuration and details of the present invention within the scope of the present invention.

INDUSTRIAL APPLICABILITY

The present invention can be applied to a traffic system using information technology (IT) such as an intelligent transport system (ITS).

This application is based upon and claims the benefit of priority from Japanese patent application No. 2020-045357, filed on Mar. 16, 2020, the disclosure of which is incorporated herein in its entirety by reference.

REFERENCE SIGNS LIST

10 deterioration diagnosis system
11 deterioration diagnosis system
100 deterioration diagnosis device
101 deterioration diagnosis device
110 image acquisition unit
120 deterioration degree calculation unit
130 reliability calculation unit
140 output unit
150 information storage unit
200 imaging device
300 display device
410 information processing apparatus
420 network
430 communication path
440 vehicle
450 facility
600 information processing apparatus
610 CPU
620 ROM
630 RAM
640 storage device
680 NIC
690 storage medium

What is claimed is:

1. A deterioration diagnosis device comprising:
a memory storing instructions; and
at least one processor coupled to the memory and configured to execute the instructions to perform operations comprising:
acquiring, from an imaging device, an image including a structure to be diagnosed;
calculating a deterioration degree of the structure by using the image;
calculating a reliability of the deterioration degree based on imaging information related to capture of the image by the imaging device;
outputting, to a display device, the deterioration degree and the reliability in association with each other;
storing the deterioration degree and the reliability;

acquiring a new image including the structure from the imaging device;

calculating the deterioration degree by using the new image;

calculating the reliability of the deterioration degree based on new imaging information related to capture of the new image by the imaging device; and when the reliability calculated based on the new imaging information is higher than the stored reliability, replacing the stored reliability with the reliability calculated based on the new imaging information.

2. The deterioration diagnosis device according to claim 1, wherein the operations further comprise:

calculating the reliability by using, as the imaging information, weather at a time of capture of the image, the time of capture of the image, and at least one of a moving speed and an acceleration of the imaging device that captured the image.

3. The deterioration diagnosis device according to claim 1, wherein the operations further comprise:

when the reliability calculated based on the new imaging information is higher than the stored reliability, replacing the stored deterioration degree with the calculated deterioration degree.

4. The deterioration diagnosis device according to claim 1, wherein the operations further comprise:

in a case that the calculated deterioration degree is worse than the stored deterioration degree, checking the calculated reliability, and, in a case that the calculated reliability is appropriate, updating the stored deterioration degree with the deterioration degree calculated by using the new image.

5. A deterioration diagnosis method performed by a computer and comprising:

acquiring, from an imaging device, an image including a structure to be diagnosed;

calculating a deterioration degree of the structure by using the image;

calculating a reliability of the deterioration degree based on imaging information related to capture of the image by the imaging device;

outputting, to a display device, the deterioration degree and the reliability in association with each other;

storing the deterioration degree and the reliability;

acquiring a new image including the structure from the imaging device;

calculating the deterioration degree by using the new image;

calculating the reliability of the deterioration degree based on new imaging information related to capture of the new image by the imaging device; and when the reliability calculated based on the new imaging information is higher than the stored reliability, replacing the stored reliability with the reliability calculated based on the new imaging information.

6. A non-transitory computer-readable recording medium storing a program executable by a computer to perform a method comprising:

acquiring, from an imaging device, an image including a structure to be diagnosed;

calculating a deterioration degree of the structure by using the image;

calculating a reliability of the deterioration degree based on imaging information related to capture of the image by the imaging device;

outputting, to a display device, the deterioration degree and the reliability in association with each other;

storing the deterioration degree and the reliability;

acquiring a new image including the structure from the imaging device;

calculating the deterioration degree by using the new image;

calculating the reliability of the deterioration degree based on new imaging information related to capture of the new image by the imaging device; and when the reliability calculated based on the new imaging information is higher than the stored reliability, replacing the stored reliability with the reliability calculated based on the new imaging information.

* * * * *